United States Patent
Gangadharaiah et al.

(10) Patent No.: US 10,963,819 B1
(45) Date of Patent: Mar. 30, 2021

(54) GOAL-ORIENTED DIALOG SYSTEMS AND METHODS

(71) Applicant: Amazon Technologies, Inc., Seattle, WA (US)

(72) Inventors: Rashmi Gangadharaiah, San Jose, CA (US); Charles Elkan, Seattle, WA (US); Balakrishnan Narayanaswamy, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 391 days.

(21) Appl. No.: 15/716,987

(22) Filed: Sep. 27, 2017

(51) Int. Cl.
*G06Q 10/02* (2012.01)
*G06N 3/04* (2006.01)
*G06F 40/44* (2020.01)
*G06F 40/56* (2020.01)
*H04L 12/58* (2006.01)

(52) U.S. Cl.
CPC ............ *G06Q 10/02* (2013.01); *G06F 40/44* (2020.01); *G06F 40/56* (2020.01); *G06N 3/0472* (2013.01); *H04L 51/02* (2013.01)

(58) Field of Classification Search
CPC ........ G06Q 50/14; G06Q 10/02; G06F 40/56; G06F 40/11; G06N 3/0472; H04L 51/02
See application file for complete search history.

(56) References Cited

U.S. PATENT DOCUMENTS

| | | | |
|---|---|---|---|
| 2009/0157664 A1* | 6/2009 | Wen | G06Q 50/14 |
| 2017/0083937 A1* | 3/2017 | Fadli | G06Q 30/0613 |
| 2017/0098159 A1* | 4/2017 | Sharifi | G06N 20/00 |
| 2019/0138606 A1* | 5/2019 | Tu | G06F 40/49 |
| 2019/0251360 A1* | 8/2019 | Cricri | G06K 9/00744 |

OTHER PUBLICATIONS

Query Recommendation for Improving Search Engine Results Published by International Journal of Information Retrieval Research i (Year: 2011).*

\* cited by examiner

*Primary Examiner* — Jeff Zimmerman
*Assistant Examiner* — Zeina Elchanti
(74) *Attorney, Agent, or Firm* — Pierce Atwood LLP

(57) ABSTRACT

A goal-oriented dialog system interacts with a user over one or more turns of dialog to determine a goal expressed by the user; the dialog system may then act to fulfill the goal by, for example, calling an application-programming interface. The user may supply dialog via text, speech, or other communication. The dialog system includes a first trained model, such as a translation model, to encode the dialog from the user into a context vector; a second trained model, such as another translation model, determines a plurality of candidate probabilities of items in a vocabulary. A language model determines responses to the user based on the input from the user, the context vector, and the plurality of candidate probabilities.

19 Claims, 12 Drawing Sheets

GOAL-ORIENTED DIALOG SYSTEMS AND METHODS

BACKGROUND

Dialog systems, also known as conversational agents or chatbots, may be used to interact with human users using speech, text, and/or other forms of communication.

Dialog processing systems and methods may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
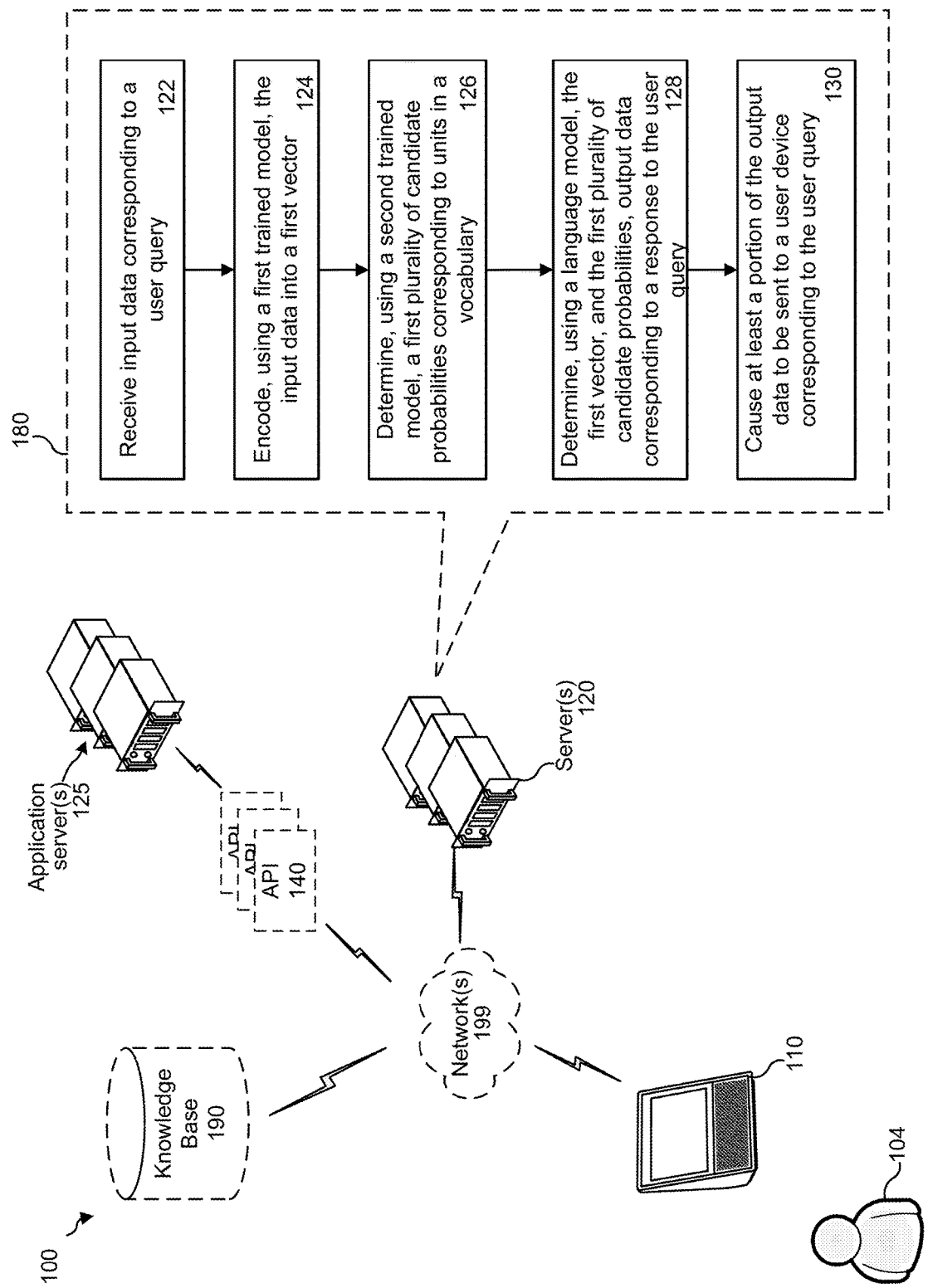
FIG. 1 illustrates a system configured to process a goal-oriented dialog session using a trained model according to embodiments of the present disclosure.

Dialog processing is a field of computer science that involves a system communicating with a human via text, audio, and/or other forms of communication. Dialog systems may be implemented using machine learning and, in some cases, using a deep neural network (DNN). Such systems may employ techniques to identify words typed, spoken, or otherwise expressed by a human user, identify meaning or intent behind the words, and determine responses to the user based thereon.

Simple dialog systems may provide basic responses to user input for entertainment purposes; these systems are sometimes known as "chit-chat" dialog systems. In other cases, dialog systems go beyond simple chit-chat and attempt to determine a goal or purpose behind the user's interaction and optionally take action in accordance with the determined goal, such as making a restaurant reservation or booking an airline ticket; these systems may be called "goal-oriented" dialog system.

Such goal-oriented dialog systems typically need to recognize, retain, and use information collected during more than one dialog back-and-forth or "turn." In some goal-oriented dialog sessions, however, the system may make an error and incorrectly assume some part of the goal, such as a restaurant type or flight date, and take further action using this incorrect information. For example, the dialog system may make a restaurant reservation (using, e.g., a call to a third-party reservation service) that includes a cuisine type not expressed by the user. Various different errors in different dialog exchanges may occur.

A basic dialog system may be created using a machine-translation model to "translate" dialog input into dialog output. An example machine-translation model may include a translation model or "encoder" and a language model or "decoder." The translation model represents a model that can encode input data in a source language (such as input audio data or input text data) to a vector that uniquely represents the input data (the vector may be, for example, a collection of numbers having values that vary with different input data). The language model represents a model that can decode the vector output by the translation model into a language string in a target language that can be sent to a user and/or acted upon by a downstream component (such as an application to perform a goal expressed in a user input). The language model may compute a probability that output data corresponds to a given portion of input data, such as a probability that a phrase in a target language matches a given phrase in a source language. The language model may be, for example, a unigram model, an n-gram model, a neural-network model, or any other model. The present invention is not limited to any particular type of encoder/decoder or translation/language models.

Offered is a system and method that improves the ability of a dialog system to identify a goal expressed by a user of the dialog system and to optionally act to fulfill that goal. The type or "domain" of the goal—i.e., to which service the goal relates—may be known a priori or may be determined by the dialog system during the dialog. In the present disclosure, a two-stage machine-translation model may be modified by adding another stage. A first stage, which may be similar to the translation model discussed above, encodes input data into a vector. A second stage uses the vector to compute a probability distribution for words in the dialog system's vocabulary for each of one or more possible output words. Thus the second stage outputs a group of probability distributions—also referred to herein as candidate probabilities—in which each respective probability distribution corresponds to a likelihood that particular a particular word of the vocabulary will be used at a particular position in an output word or phrase. A higher candidate probability corresponds to a higher chance that a candidate output word is selected as an output word. Inclusion of the second stage allows the system to retain a more accurate history of past dialog and to better ascertain and represent the goal expressed by the user by maintaining the candidate probabilities of output data. A language model then uses not just the vector representing the user input—as in existing systems—but also the candidate probabilities to generate output data that may include a text response to be sent to the user and/or instructions that can be executed by a downstream component to take action on a goal expressed by the user. For example, given multiple turns of user input relating to a restaurant reservation, a candidate probability for a word or words relating to a first cuisine may be determined to be greater than a candidate probability for word or words relating to a second cuisine. The dialog system would then select the first cuisine over the second when making a restaurant reservation and/or output corresponding instructions to be sent to a reservation application.

A goal-oriented dialog system may include several components that are each responsible for performing a specific task. For example, one module may include a dialog-state tracker to compress the dialog history (e.g., some representation of data that has been passed to/from the system to/from the user along with potential system created data as part of the dialog). Another module may include a dialog-policy manager to select the system's next action and/or response based on the dialog state. Another module may include a natural-language generator for converting a selected action to text. A goal-oriented dialog system may further include automatic speech-recognition (ASR) and text-to-speech modules for communicating with a user via audio. The modules may be trained individually, in groups, or all together.

In one example interaction with a dialog system, shown below in Table 1, a user interacts with a dialog system to make a restaurant reservation. The user inputs illustrated may be input in text format or may be spoken to an audio capture device, which may then perform ASR operations to create the text listed in the "User Input" column of Table 1. The user input is then processed by the system, for example using the models and techniques described below, to arrive at the respective system output. The system may track information related to the dialog in order to update the system output relative to the user input at each turn, ultimately leading to execution of the goal desired by the user.

As illustrated in Table 1, the user provides constraints such as cuisine, number of people, and price range. The user may provide the constraints without specific prompting by the dialog system, such as in turn 2, in which the user indicates party size and cuisine type. The dialog system may instead or in addition prompt the user for constraints, such as in turns 3 and 4, in which the system prompts the user for location and price range. The dialog system may, in any turn, query a knowledge base (using, e.g., an SQL (Structured Query Language) query) to retrieve additional information related to the goal, such as restaurant reservation availability for a given date and time. In Table 1, during a series of turns, the dialog system determines that the user's goal is to make a reservation at an Italian restaurant in Paris in a moderate price range. The dialog system may then determine a request to another device (such as a third-party device) in accordance with the user's goal via, for example, an application-programming interface (API) corresponding to an application 1190 capable of making restaurant reservations.

TABLE 1

Sample Dialog

| Turn Number | User Input | System Output |
|---|---|---|
| 1 | "Hi." | "Hello, what can I help you with today?" |
| 2 | "May I have a table for six with Italian food?" | "I'm on it." |
| 3 | <silence> | "Where should it be?" |
| 4 | "Paris, please." | "Which price range are you looking for?" |

TABLE 1-continued

Sample Dialog

| Turn Number | User Input | System Output |
|---|---|---|
| 5 | "In a moderate price range, please." | "OK - let me look into some options for you." |
| 6 | | [request: restaurant Italian Paris six moderate] |

In another example, a user similarly interacts with a dialog system to make a restaurant reservation, as shown below in Table 2. In this example, however, the user's dialog is more complicated in that it includes several updates to previously expressed constraints, such as an update in turn 3 from Vietnamese cuisine to Japanese cuisine. As a result of the additional complexity of the user's dialog, the dialog system makes an error; in turn 8, the dialog system determines that the request to the third-party device includes a cuisine not expressed by the user (in this example, Cantonese).

TABLE 2

Sample Dialog with Mistake

| Turn Number | User's Utterance | Response |
|---|---|---|
| 1 | "I'd like to book a table for eight people in a cheap price range in Seoul with Vietnamese cuisine." | "I'm on it." |
| 2 | <silence> | [request: Vietnamese Seoul eight cheap] |
| 3 | "Actually, I would prefer with Japanese cuisine." | "Sure, is there anything else to update?" |
| 4 | "Actually, I would prefer in an expensive price range." | "Sure, is there anything else to update?" |
| 5 | "Instead, could it be in Tokyo?" | "Sure, is there anything else to update?" |
| 6 | "Actually, I would prefer for six." | "Sure, is there anything else to update?" |
| 7 | "No." | "OK - let me look into some options for you." |
| 8 | <silence> | [request: restaurant Cantonese Tokyo six expensive] |

Errors such as the one shown in Table 2 may occur in existing dialog systems because the systems are unable to maintain an accurate representation of the history of the dialog over many turns of dialog, particularly when, as in the example of Table 2, the user repeatedly updates expressed constraints. Further errors may arise in existing systems due to relatively small training corpuses; machine-translation systems, in contrast, benefit from a wealth of hand-crafted and peer-reviewed document translations freely available. Goal-oriented dialog systems may instead have to rely on either actual chat transcripts, which may themselves contain errors like the one in Table 2, or artificial chat transcripts, which may be free of errors but may not accurately predict actual chat dialog.

FIG. 1 shows a system 100 configured to perform dialog processing according to embodiments of the disclosure. As one of skill in the art will understand, although FIG. 1 (and other figures and discussion herein) illustrate the operation of the system 100 in a particular configuration and order, the steps described herein may be performed in a different order (and certain steps may be removed or added) without departing from the intent of the disclosure. As shown in FIG. 1, the system 100 may include one or more server(s) 120 configured to perform a number of steps 180. The server(s) 120 may be a single device or may be one or more different physical devices.

The server(s) 120 receives (122) input data corresponding to a user query and encodes (124) the input data into a first vector using a first trained model (e.g., a first translation model). The input data may be text data created using, for example, a chat program executing on the client 110. The input data may be, instead of or in addition to the text data, any other type of communication data, such as sound data, video data, gestures, button presses, or any other such communicative input. The vector may be any collection of numbers and/or other characters that represents units of input data; in some embodiments, the vector represents a number of words of a turn of input dialog from the user.

As noted above, the input data may be received directly from a client device 110. Alternatively, the input data may be converted into a different format by a conversion program after leaving the client 110. For example, audio data may be received from a client device 110 and then converted into text data using an ASR processing program. The resulting text data may then be sent to the first trained model. The present invention does not require use of such a conversion program, however.

The server(s) 120 then processes the encoded vector using a second trained model (e.g., a second translation model) to determine (126) a first plurality of probability distributions corresponding to candidate probabilities of items in a vocabulary, where each probability distribution corresponds to a likelihood that a particular word in the system's vocabulary corresponds to response data corresponding to a response to the user query and/or instruction data corresponding to a goal expressed by the user. Then the server(s) 120 processes the encoded vector and probabilities using a language model to determine (128) second data corresponding to the response to the user query and/or the instruction data. The server(s) 120 may then send (130) at least a portion of the output data to the user device corresponding to the user query. Alternatively, the server(s) 120 or some other component may process at least a portion of the second data for sending to the user device. For example, the server(s) may process text in the second data by a text-to-speech (TTS) component (such as TTS component 1180 discussed below) to generate output audio data representing output speech for sending to a user device. In some embodiments, the server(s) 120 may determine the instruction data and cause the instruction data to be sent to the application server(s) 125 via API 140.

The system 100 may further include additional elements. A client device 110 (which may be operated by a user 104) may communicate with the server 120 via a network 199. The client device 110 may be, for example, a computer, smartphone, tablet, smart speaker, or any other such device. The user 104 may communicate with the client device 110 using a text-entry device, such as a keyboard or touchscreen, using an audio-capture device, such as a microphone or microphone array, using an image-capture device, such as a camera or video camera, or any other such communication device or system. The client device 110 may include an output device, such as a screen, touchscreen, speaker, haptic-feedback device, etc., for relaying communications from the server 120.

The network 199 may include the Internet and/or any other wide- or local-area network, and may include wired, wireless, and/or cellular network hardware. The server 120 may communicate, via the network 199, with one or more knowledge bases 190 to query and receive information related to the dialog and/or goal of the user 104. The server 120 may transmit, via the network 199, a request to a device via an API 140 which in turn may communicate with an application server 125. Each API 140 and application server 125 may correspond to a particular application. For example, a first API 140a and a first application server 125a may correspond to a first application, for example an application for scheduling restaurant reservations, while a second API 140b and a second application server 125b may correspond to a second application, for example an application for booking flight reservations. A particular application may, for example, be operated within server(s) 120, for example applications 1190 discussed below in reference to FIG. 11. The system may include various applications 1190 and/or application server(s) 125 depending on the number of goals and actions the system is configured to execute in response to a user command.

Figure 2:
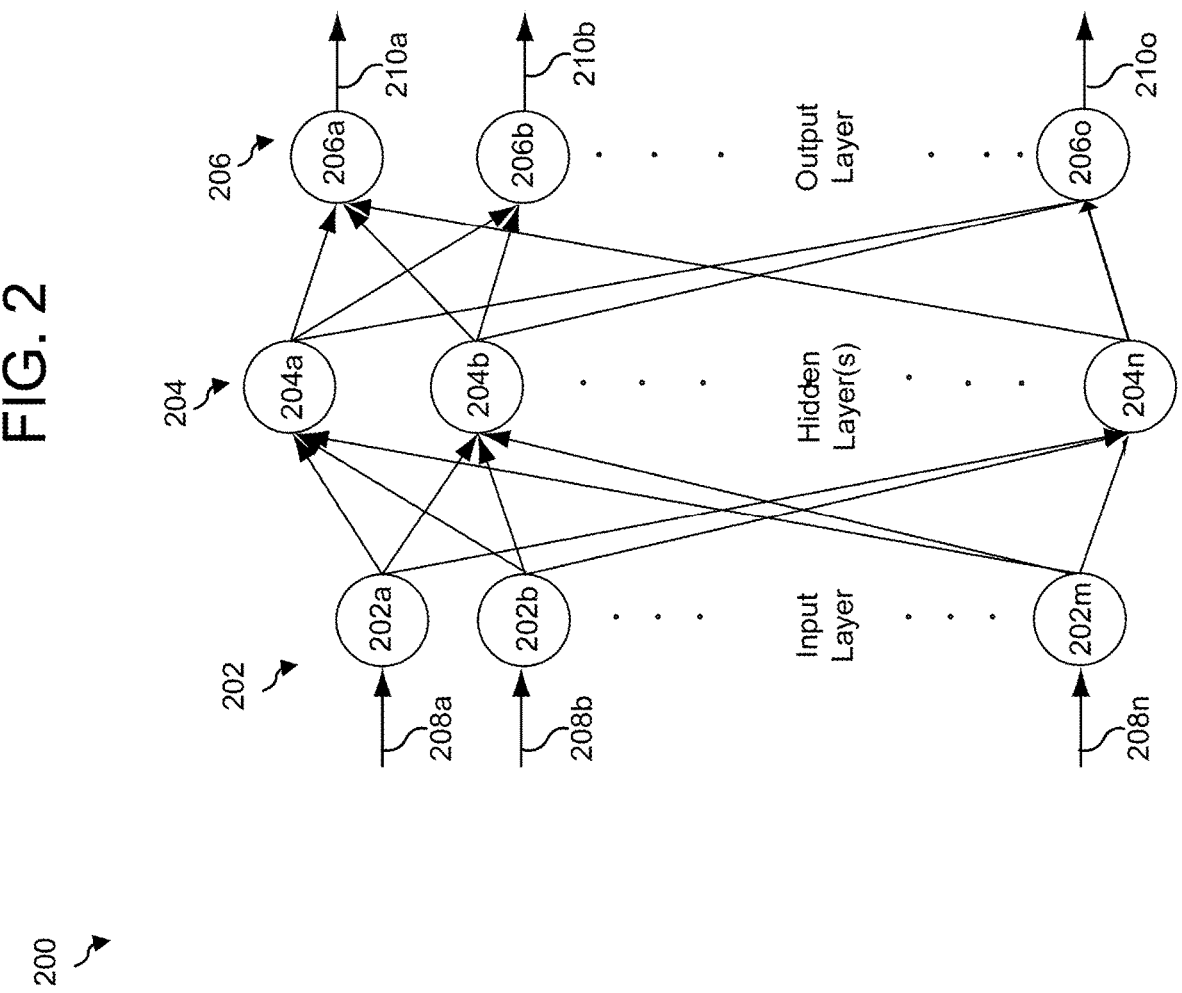
FIG. 2 illustrates an example structure of a neural network for dialog processing according to embodiments of the present disclosure.

Neural networks may be used to perform dialog processing, including translation-model processing and language-model processing. An example neural network 200 is illustrated in FIG. 2. The neural network 200 may include nodes organized as an input layer 202, a hidden layer 204, and an output layer 206. The input layer 202 may include m nodes, the hidden layer 204 n nodes, and the output layer 206 o nodes, where m, n, and o may be any numbers and may represent the same or different numbers of nodes for each layer. Each node of each layer 202, 204, 206 may include computer-executable instructions/data usable for receiving one or more input values and for computing an output value. Each node may further include memory for storing the input, output, or intermediate values. One or more data structures, such as a long short-term memory cell or other cells or layers, may additionally be associated with each node for purposes of storing different values. Nodes 202a, 202b, . . . 202m of the input layer 202 may receive inputs 208a, 208b, . . . 208m, and nodes 206a, 206b, . . . 206o of the output layer 206 may produce outputs 210a, 210b, . . . 210o. In some embodiments, the inputs 208a, 208b, . . . 208m correspond to dialog input data, and the outputs 210a, 210b, . . . 210o correspond to dialog output data. The input layer 202 may thus correspond to a first stage of a translation model, the intermediate layer 204 may correspond to a second stage of a translation model, and the output layer 206 may correspond to a language model, as discussed in more detail below; the layers 202, 204, 206 may not, however, correspond precisely to each model, and any arrangement or allotment of layers 202, 204, 206 is within the scope of the present disclosure. Each node 204a, 204b, . . . 204m of the hidden layer 204 may be connected to one or more nodes 202a, 202b, 202m in the input layer 202 and one or more nodes 206a, 206b, . . . 206o in the output layer 204. Although the neural network 200 illustrated in FIG. 2 includes a single hidden layer 204, other neural network may include multiple middle layers 204; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

Figure 3:
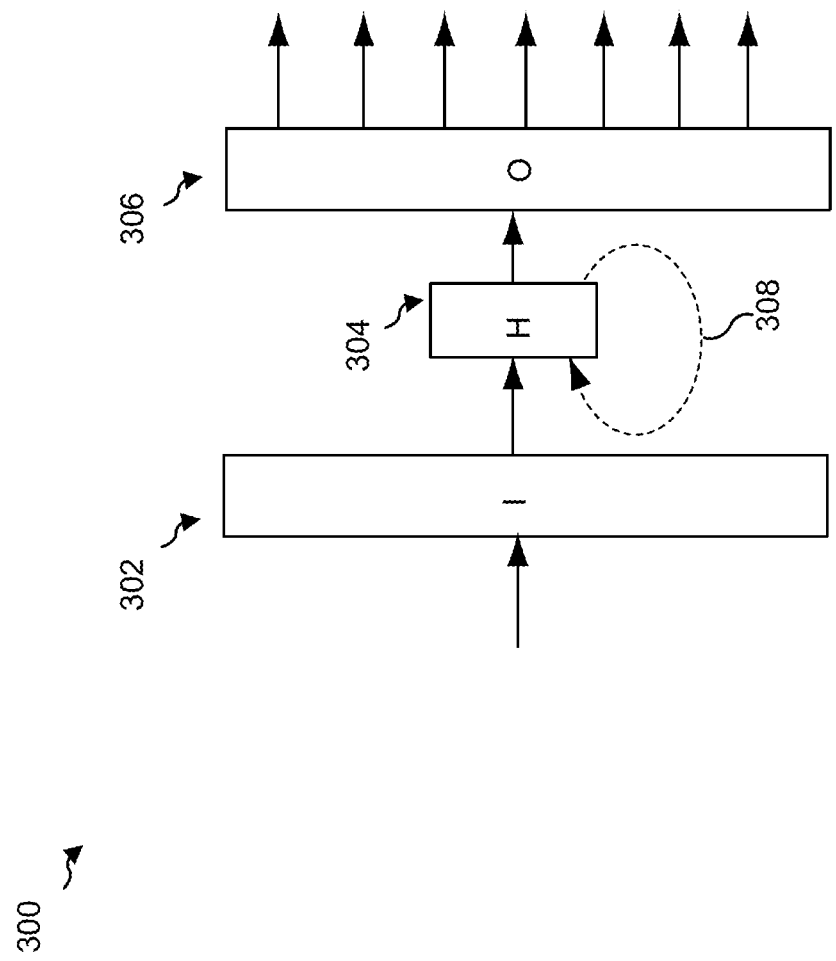
FIG. 3 illustrates an example structure of a recurrent neural network for dialog processing according to embodiments of the present disclosure.

In one aspect, a neural network is constructed using recurrent connections such that one or more outputs of the hidden layer of the network feeds back into the hidden layer again as a next set of inputs. Such a neural network 300 is illustrated in FIG. 3. Each node of the input layer 302 connects to each node of the hidden layer 304; each node of the hidden layer 304 connects to each node of the output layer 306. As illustrated, one or more outputs 308 of the hidden layer 304 is fed back into the hidden layer 404 for processing of the next set of inputs. A neural network incorporating recurrent connections may be referred to as a recurrent neural network (RNN). An RNN or other such feedback network may allow a network to retain a "memory" of previous states and information that the network has processed.

In the case in which a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network 300 illustrated in FIG. 3, the prediction of the potential next word may be based on previous words in an utterance and not just on the most recent word. The language model neural network may also output weighted predictions for the next word.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as backpropagation, the weights of the neural network may be updated to reduce errors made by the neural network when processing the training data. In some circumstances, the neural network may be trained with an entire lattice to improve speech recognition when the entire lattice is processed.

Figure 4:
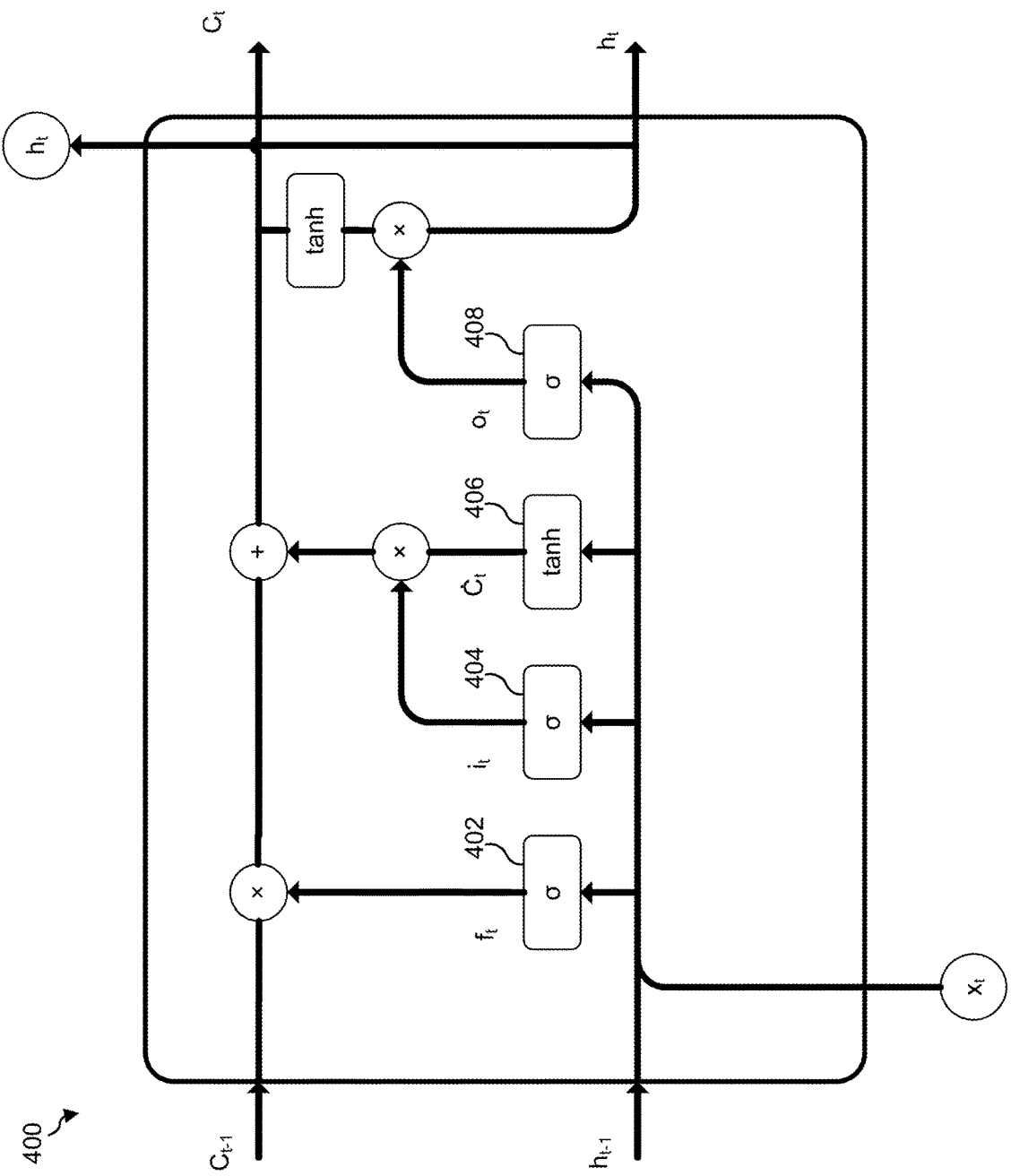
FIG. 4 illustrates a long-short-term memory (LSTM) cell for dialog processing according to embodiments of the present disclosure.

FIG. 4 illustrates an exemplary long short-term memory (LSTM) cell 400 capable of learning long-term dependencies. The LSTM cell 400 may be incorporated in, for example, the encoders 502a, 502b and/or decoders 504a, 504b of FIG. 5 or the translation model 606 and/or language model 612 of FIG. 6. The LSTM cell 400 receives an input vector $x_t$ and generates an output vector $h_t$. If the LSTM cell 400 is part of an encoder or translation model, the input vector $x_t$ corresponds to user input, such as input text data 510 of FIG. 5 or input data 602 of FIG. 6; the output vector $h_t$ corresponds to a context vector, such as the context vector 512 of FIG. 5 or the context vector 614 of FIG. 6. If the LSTM cell 400 is part of a decoder or language model, the input vector $x_t$ corresponds to a context vector, such as the context vector 512 of FIG. 5 or the context vector 614 of FIG. 6, and the output vector $h_t$ corresponds to dialog output, such as output text data 514a-514b of FIG. 5 or output data 604 of FIG. 6.

The cell further maintains a cell state $C_t$ that is updated given the input $x_t$, a previous cell state $C_{t-1}$, and a previous output $h_{t-1}$. Using the previous state and input, a particular cell may take as input not only new data ($x_t$) but may also consider data ($C_{t-1}$ and $h_{t-1}$) corresponding to the previous cell. The output $h_t$ and new cell state $C_t$ are created in accordance with a number of neural network operations or "layers," such as a "forget gate" layer 402, an "input gate" layer 404, a tan h layer 406, and a sigmoid layer 408.

The forget gate layer 402 may be used to remove information from the previous cell state $C_{t-1}$. The forget gate layer 402 receives the input $x_t$ and the previous output $h_{t-1}$ and outputs a number between 0 and 1 for each number in the cell state $C_{t-1}$. A number closer to 1 retains more information from the corresponding number in the cell state $C_{t-1}$, while a number closer to 0 retains less information from the corresponding number in the cell state $C_{t-1}$. The output $f_t$ of the forget gate layer 402 may be defined by the below equation.

$$f_t = \sigma\{W_f \cdot [(h_{t-1}),(x_t)] + b_f\} \quad (1)$$

The input gate layer 404 and the tan h layer 406 may be used to decide what new information should be stored in the cell state $C_{t-1}$. The input gate layer 404 determines which values are to be updated by generating a vector $i_t$ of numbers between 0 and 1 for information that should not and should be updated, respectively. The tan h layer 406 creates a vector $\dot{C}$ of new candidate values that might be added to the cell state $C_t$. The vectors $i_t$ and $\dot{C}$, defined below, may thereafter be combined and added to the combination of the previous state $C_{t-1}$ and the output $f_t$ of the forget gate layer 402 to create an update to the state $C_t$.

$$i_t = \sigma\{W_i \cdot [(h_{t-1}),(x_t)] + b_i\} \quad (2)$$

$$\dot{C}_t = \tan h\{W_c \cdot [(h_{t-1}),(x_t)] + b_c\} \quad (3)$$

Once the new cell state $C_t$ is determined, the sigmoid layer 408 may be used to select which parts of the cell state $C_t$ should be combined with the input $x_t$ to create the output $h_t$. The output $o_t$ of the sigmoid layer 408 and output $h_t$ may thus be defined by the below equations. These values may be further updated by sending them again through the cell 400 and/or through additional instances of the cell 400.

$$o_t = \sigma\{W_o \cdot [(h_{t-1}),(x_t)] + b_o\} \quad (4)$$

$$h_t = o_t \cdot [\tan h(C_t)] \quad (5)$$

Figure 5:
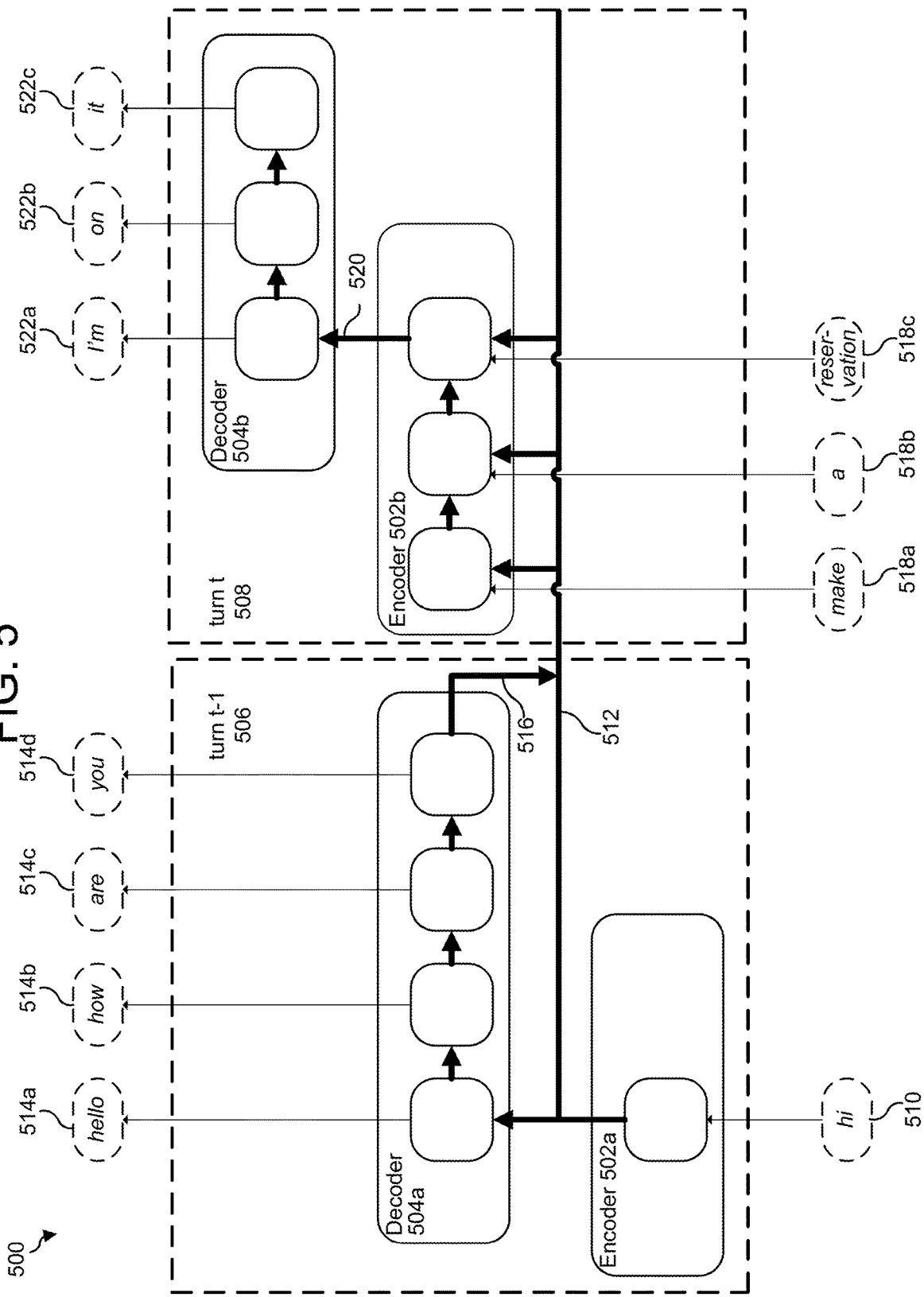
FIG. 5 illustrates a sequence-to-sequence model for dialog processing according to embodiments of the present disclosure.

FIG. 5 illustrates a sequence-to-sequence model 500 that includes encoders 502a, 502b and decoders 504a, 504b. A first turn t-1 506 of dialog is shown with a second turn t 508 of dialog. The encoder 502a and decoder 504a used in the first turn 506 may be re-used as the encoder 502b and decoder 504b in the second turn 508; that is, the outputs of the encoder 502a and decoder 504a in the first turn 506 may be fed back to the same encoder 502b and decoder 504b in the second turn 508. Alternatively, the model 500 may be "unrolled" for each turn 506, 508 and use first instances of encoder 502a and decoder 504a in the first turn 506 and second instances of encoder 502b and decoder 504b in the second turn 508. Though FIG. 5 illustrates only two turns 506, 508, any number of turns may be unrolled. In some embodiments, the model 500 is unrolled into a number of instances during training, but fewer instances, including only one copy, are used in operation.

The encoder 502a, 502b and decoder 504a, 504b may be implemented using the LSTM cell 400 of FIG. 4, other types of LSTM cells, other recurrent or convolutional structures, embedding layers, dense layers, or any other such neural-network layers or cells known in the art. In some embodiments, the encoder 502a, 502b includes embedding and LSTM layers, and the decoder 504a, 504b includes dense and LSTM layers. An embedding layer may include a transformer, such as a matrix multiplication, that transforms words into their corresponding vector formats or "embeddings." A dense or "fully connected" layer is a layer in which every input is connected to every output by a weight and which performs an operation on the input to the layer based on the weights. The sequence-to-sequence model 500 may be implemented using any computing language, using hardware and/or software, and on any computing system.

In the case in which the model 500 is not unrolled, the encoder 502a may be used, in a first turn 506, to encode an input sequence 510 into a first vector 512; this first vector 512 may also or instead be known as a thought vector, context vector, or as any other fixed-dimensional, distributed representation. The first vector 512, as one of skill in the art will understand, may be any single- or multi-dimensional set of values that reflects the words in the input text data 510. In one embodiment, the first vector 512 is a one-dimensional vector of integers in which a given integer represents a corresponding word in the input sequence; the integer "38573" may represent the word "reservation," for example. The first vector 512 may contain different representations for words, however, and may contain additional information, such as information regarding phrases, proper names, misspellings, number of turns, or any other information in the input text data 510 or elsewhere.

The vector 512 may then be used by the decoder 504a to generate output text data 514a-d. In a second turn 508, the encoder 502b receives a second turn of input text data 518a-c and creates a second vector 520. The decoder 504b takes the second vector 520 and generates output text data 522 for the second turn 508. In this simple example, in a first turn 506, a user enters text "hi," and the model 500 responds, "hello, how are you." In a second turn 508, the user enters text "make a reservation," and the model responds, "I'm on it." The response of the model (e.g., the output text data) is determined based on how the model is trained to respond to certain input text data, as illustrated by, for example, FIG. 10 and associated text. Possible variations in responses include but are not limited to the number of words of output in each turn, word selection for each position of output, sentence type (e.g., statement or question), or other such variations; the content of the output may include greeting the user, confirming receipt of information, prompting the user for further information, or other such content.

The relationships between the inputs, outputs, and state of the model 500 may be defined by the below equations, in which the input text data 510, 518a-518b is given by $X_t = x_1^t, x_2^t, \ldots x_L^t$ in turn t and the output text data 514a-514d, 522a-522c to be generated is defined by $Y_t = y_1^t, y_2^t, \ldots y_{L'}^t$ in turn t, wherein L is the length of the input text data and L' is the length of the output text data. The encoder 502a, 502b determines $x_k^t$ from the raw input word at position k; in some embodiments, the encoder 502a, 502b includes an embedding layer to perform this function. A cell state vector $C_t = c_1^t, c_2^t, \ldots c_L^t$ denotes the cell state vector at word position k in turn t.

$$i_{k,enc}^t = \sigma\{W_{i,enc} \cdot [(h_{k-1,enc}^t), (x_k^t), (h_{L',dec}^{t-1}), (h_{L,enc}^{t-1})] + b_{i,enc}\} \quad (6)$$

$$f_{k,enc}^t = \sigma\{W_{f,enc} \cdot [(h_{k-1,enc}^t), (x_k^t), (h_{L',dec}^{t-1}), (h_{L,enc}^{t-1})] + b_{f,enc}\} \quad (7)$$

$$o_{k,enc}^t = \sigma\{W_{o,enc} \cdot [(h_{k-1,enc}^t), (x_k^t), (h_{L',dec}^{t-1}), (h_{L,enc}^{t-1})] + b_{o,enc}\} \quad (8)$$

$$\tilde{C}_{k,enc}^t = \tan h\{W_{C,enc} \cdot [(h_{k-1,enc}^t), (x_k^t), (h_{L',dec}^{t-1}), (h_{L,enc}^{t-1})] + b_{C,enc}\} \quad (9)$$

$$c_{k,enc}^t = f_{k,enc}^t \cdot c_{k-1,enc}^t + i_{k,enc}^t \cdot \tilde{C}_{k,enc}^t \quad (10)$$

$$h_{k,enc}^t = o_{k,enc}^t \cdot \tan h(c_k, enc) \quad (11)$$

In some embodiments, as shown in FIG. 5, the model 500 is unrolled and the output 512 of the encoder 502a and/or the output 516 of the decoder 504a in the first turn 506 are appended to the input 518a-c of the encoder 502b in a subsequent turn 508 (in contrast to the embodiment described above). The output of each cell in the decoder, $h_t$, may thus computed as shown by the below equations.

$$i_{k,dec}^t = \sigma\{W_{i,dec} \cdot [(h_{k-1,dec}^t), (h_{L,enc}^t)] + b_{i,dec}\} \quad (12)$$

$$f_{k,dec}^t = \sigma\{W_{f,dec} \cdot [(h_{k-1,dec}^t), (h_{L,enc}^t)] + b_{f,dec}\} \quad (12)$$

$$o_{k,dec}^t = \sigma\{W_{o,dec} \cdot [(h_{k-1,dec}^t), (h_{L,enc}^t)] + b_{o,dec}\} \quad (12)$$

$$\tilde{C}_{k,dec}^t = \tan h\{W_{C,dec} \cdot [(h_{k-1,dec}^t), (h_{L,enc}^t)] + b_{C,dec}\} \quad (13)$$

$$c_{k,enc}^t = f_{k,enc}^t \cdot c_{k-1,enc}^t + i_{k,enc}^t \cdot \tilde{C}_{k,enc}^t \quad (14)$$

$$h_{k,enc}^t = o_{k,enc}^t \cdot \tan h(c_k, enc) \quad (15)$$

$$c_{k,dec}^t = f_{k,dec}^t \cdot c_{k-1,dec}^t + i_{k,dec}^t \cdot \tilde{C}_{k,dec}^t \quad (10)$$

$$h_{k,dec}^t = o_{k,dec}^t \cdot \tan h(c_k, dec) \quad (11)$$

Figure 6:
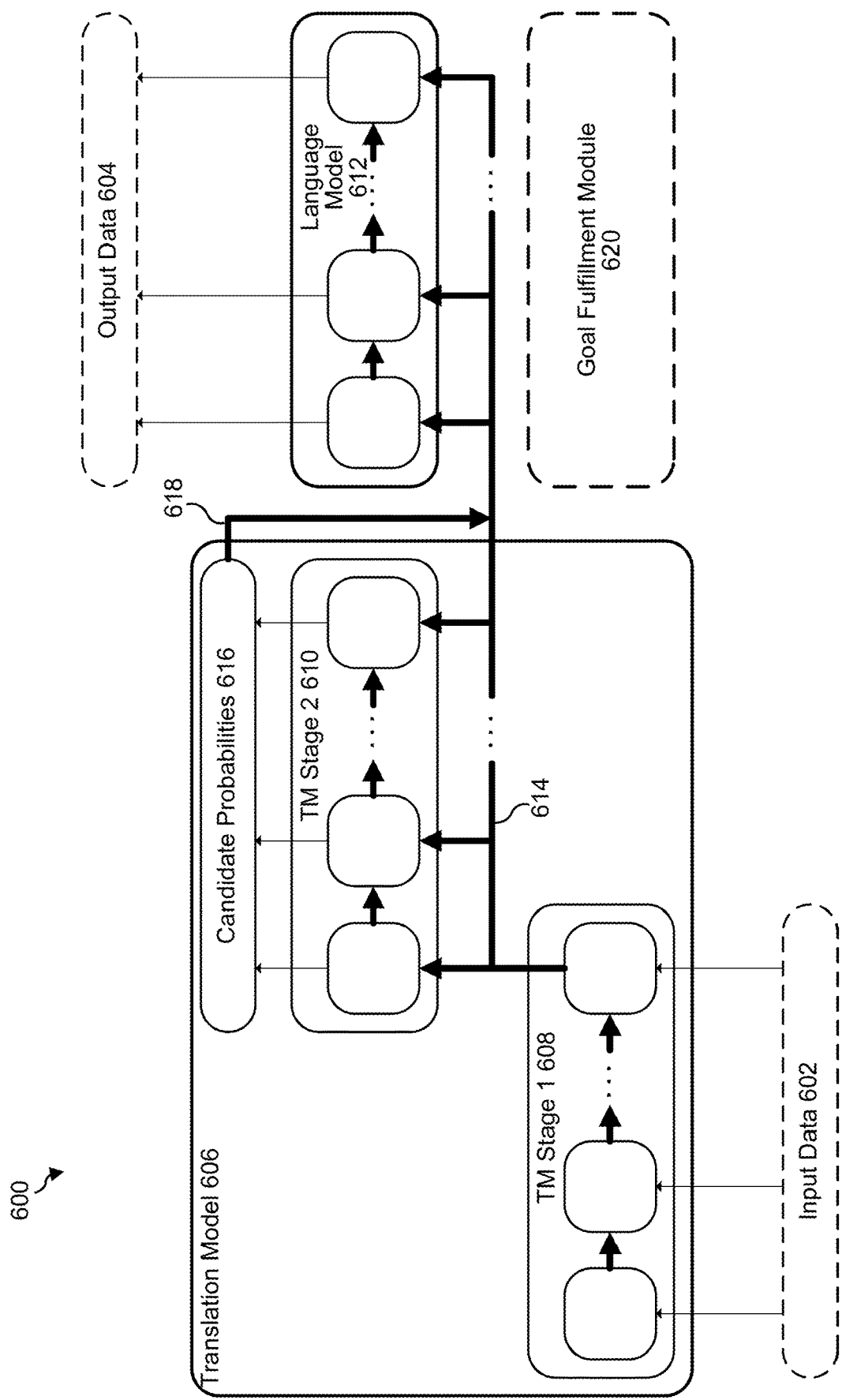
FIG. 6 illustrates a translation/language model for dialog processing according to embodiments of the present disclosure.

FIG. 6 illustrates a model 600 for a goal-based dialog system that receives input data 602, determines output data 604, which may include response data and/or instruction data. The response data may be used to respond to a user based on the input data, and the instruction data may be used to optionally perform a task corresponding to a goal expressed in the input data 602 such as, for example, making an API call to a compute service that facilitates booking a restaurant reservation. Thus the output data 604 may include a first portion meant to be used to respond to a user (for example through a text-to-speech (TTS) operation) and a second portion which includes instruction data to be sent to an API 140 and an application server 125 or application 1190. The model 600 may be operated by a dialog engine 1110. The model 600 includes a trained model for calculating candidate probabilities of words in a vocabulary using, in some embodiments, multi-label classification. The model 600 further includes a language model for computing an output response vector based at least in part on the candidate probabilities by, in some embodiments, computing a conditional probability of the output data. In some embodiments, the trained model is a translation model 606 and includes two parts, stages, or segments, as shown in FIG. 6; a first translation-model stage 608 and a second translation-model stage 610. The first translation-model stage 608 may include embedding, LSTM, and/or dense layers and may translate input data 602 into a vector 614, which may be referred to as a context or thought vector. The second translation-model stage 610 may contain LSTM and dense layers and perform the multi-label classification and calculation of the candidate probability 616 mentioned above. The translation model 606 is not limited to two stages 608, 610, and any number of stages is within the scope of the present disclosure.

The language model referred to above may be the language model 612 of FIG. 6 and may receive the context vector 614 and a vector 618 representing the candidate probabilities 616. Based on these inputs, the language model 612 outputs the output data 604. During the dialog corresponding to input data 602 and output data 604, a determination may be made that a goal expressed in the input data 602 has been determined and that corresponding instruction data has been determined. This instruction data may be sent to a device, such a device corresponding to a third-party fulfillment service via, for example, an API 140, application server 125 and/or application 1190.

The determination of the instruction data relating to the goal may be made by the translation model 606 and/or language model 612. In some embodiments, a goal-fulfillment module 620, which may be part of the dialog engine 1110, may be used to process and/or transmit the instruction data to an API 140. In some embodiments, the device to which the instruction data is sent (e.g., a device associated with a third-party service) is known; in other embodiments, the model 600 determines the device using the input data. The device may be determined using an explicit statement of the user, e.g., "I want to make a restaurant reservation" or "I want to book a flight." The device may also or instead be determined by inferring it from the input data based on the intent of the user, e.g., "What places serve good food around here?" or "I want to go on vacation next weekend." The translation model 606 and/or language model 612 may be trained to make this determination.

Determination of the goal and associated instruction data may depend on a number of the probabilities 616 being greater than a threshold, a number of turns, or other similar metric. In other embodiments, determination of the request is learned by the neural networks of the translation mode 606 and/or language model 612 when they analyze a training corpus of dialog data containing goals. The model 600 may be implemented using any computing language, using hardware and/or software, and on any computing system.

The second translation-model stage 610 may calculate a conditional probability, $p(y_i|h_{L,TM1}{}^t)$, for items $y_i$ in a vocabulary. The vocabulary may include all known words in one or more given languages, such as every word in English and/or French, or some subset thereof. The subset may include a number of most-used words of the language(s), all words that appear in a training corpus, a number of most-used words in the training corpus, a number of words that, during training, are determined to cause errors such as the error described above with reference to FIG. 2, or just words selected by the user to appear the input data 602. The vocabulary may also be limited to words that are likely to be used by a user in relation to a particular goal or set of goals executable by the system. In other embodiments, however, the vocabulary includes items other than words, such as, for example, gestures, sounds, shapes, signs, or any other such collection of items. Any vocabulary is within the scope of the present disclosure.

The candidate probabilities output from the second translation-model stage 610 may include probability distributions for potential positions of output data to be sent to the user (i.e., response data) and/or API (i.e., instruction data). For example, the second translation-model stage 610 may include twenty probability distributions in the candidate probabilities 616 corresponding to twenty possible positions of response and/or instruction data. Each probability distribution includes a ranking of items in the vocabulary in accordance with their likelihood to be used in positions of potential output data. Thus, a first probability distribution ranks potential words for one word of output data, a second probability distribution ranks potential words for another word of output data, and so on. The second translation-model stage 610 may vary the number of candidate probabilities 616 for different turns of dialog or may set the number of candidate probabilities 616 at a fixed maximum. The number of candidate probabilities 616 may be determined by the input data 602 and/or during training of the second translation-model stage 610.

In some embodiments the candidate probabilities 616 have a one-to-one correspondence with positions of output data. In other embodiments, given that the probability distributions may not necessarily result in a coherent response alone (for example, selecting the top scoring words of each position vector may not result in a coherent twenty word response), the language model 612 may operate on the position-based probability distributions to create a coherent response in the form of output data. The number of positions in the output data may be greater than or less than the number of candidate probabilities 616. The language model 612 and/or second translation-model stage 610 may further determine which candidate probabilities 616 correspond to response data and which correspond to instruction data.

As stated above, the language model 612 receives both the context vector 614 and probability vector 618 as input. The language model 612 may compute the candidate probability of the output data 604 in accordance with the following equation.

$$p(y_1, \ldots y_{L'}{}^t | h_{L,TM1}{}^t, h_{TM2}{}^t) = \Pi_{i=1}^{L'} p(h_{L,TM1}{}^t, h_{TM2}{}^t) \qquad (13)$$

In the above equation, $(y_1, y_2, \ldots y_{L'})$ is the output response sequence in turn t; $y_k{}^t$ may be obtained by performing a softmax function over all the words in the vocabulary for each position in the response. The values $h_{L,TM1}{}^t$ and $h_{TM2}{}^t$ represent the outputs of the first and second translation-model stages 608, 610, respectively. As above, L represents the number of words in a given turn t of input, and L' represents the number of words in a given turn t of output.

Figure 7:
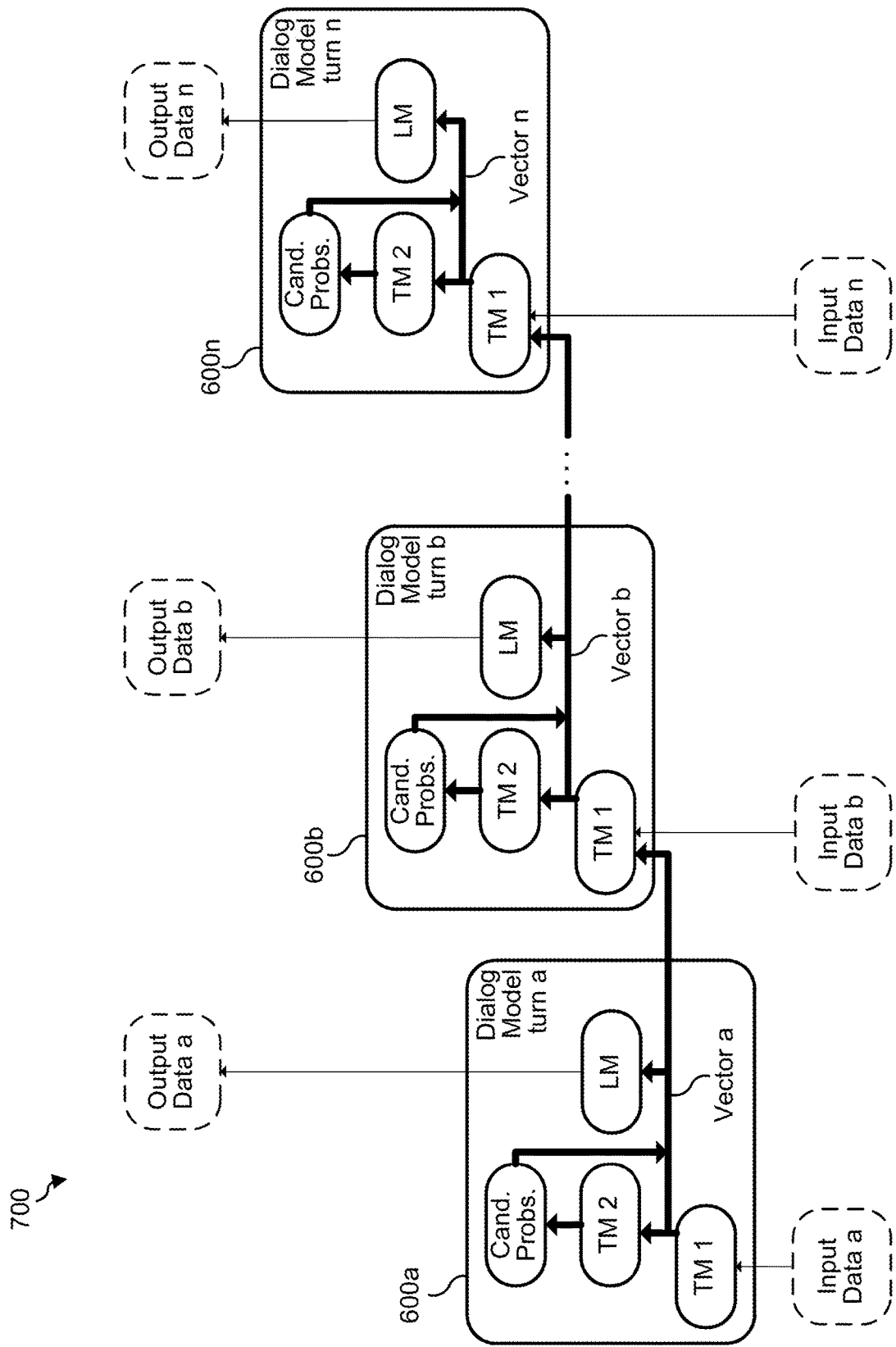
FIG. 7 illustrates a translation/language model for processing multi-turn dialog according to embodiments of the present disclosure.

FIG. 7 illustrates a representation 700 of the model 600 of FIG. 6 used in multi-turn dialog, such as a dialog between a user and the system as managed by the dialog engine 1110. In a first turn a, an instance 600a of the model 600 is used to receive input data a and create output data a; in a second turn b, an instance 600b of the model 600 is used to receive input data b and create output data b, which may include response data and/or instruction data. For example, input data a may be, "Hello, I'd like to make a reservation for four at 6 PM tomorrow night;" the first instance 600a of the model 600 may be trained (with reference to the training process 1000 of FIG. 10) to generate output data b of "OK, what cuisine?" The user may then provide input data b, "Italian"; the second instance 600b of the model may be trained to respond with output data b, "OK, I'm on it." In each turn, the context vector (e.g., context vector 614 of FIG. 6) and probabilities vector (e.g., probabilities vector 618 of FIG. 6) of a previous turn are used in a current turn. Any number of turns may thus be accommodated, as shown by instance 600n and turn n of FIG. 7. As stated above with reference to FIG. 5, the instances 600a-n may be unrolled during training but, during runtime, a single instance 600 may be used.

Figure 8:
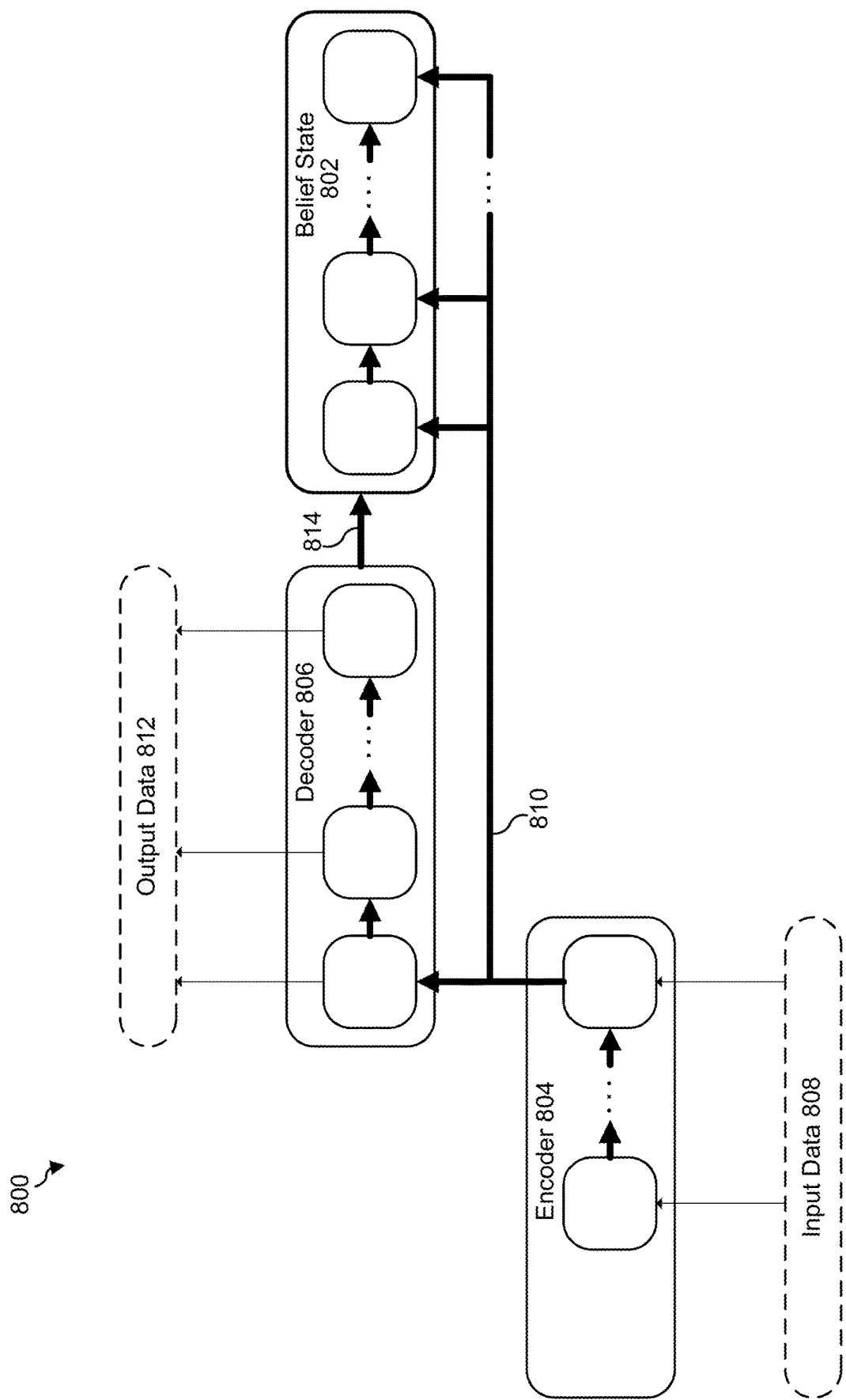
FIG. 8 illustrates a state-tracking model for dialog processing according to embodiments of the present disclosure.

FIG. 8 illustrates a dialog model 800 having a state tracker 802. The state tracker 802 may be used instead of or in addition to other elements of the present disclosure, such as the second translation-model stage 610 of FIG. 6. The dialog model 800 includes features discussed elsewhere in the present disclosure, such as an encoder 804 and a decoder 806; the encoder 804 may be used to encode dialog input 808 into a context vector 810, and the decoder 806 may be used to generate output data 812 given the context vector 810.

As shown in FIG. 8, the state tracker 802 receives the context vector 810 and the output 814 of the decoder 806; the state tracker 802 may include LSTM cells, such as LSTM cell 400. The state tracker 802 may be used to store possible belief states at each turn of dialog; a belief state may be used to store a value for a particular type, category, or aspect of information to be used in the instruction data, and a word may be stored in a corresponding belief state when it appears in the input data. In other words, in contrast to the trained model 610 which is trained to compute candidate probabilities for output data, one or more belief states may be explicitly hand-designed to store information known to be important instruction data. For example, if the state tracker 802 is to be used to make restaurant reservations, its belief states might be preprogrammed to include "cuisine," "place," "number of diners," and "price range." If, during runtime, the input data 808 includes the text "Please make a reservation for four for Italian food," the state tracker 802 assigns "Italian" to the cuisine state and "four" to the number-of-diners state. Once a minimum number of belief states are assigned, the decoder 806 may include one or more words stored in the belief states in the instruction data as part of a request to an application device or service (via, e.g., an API call) in accordance with a goal expressed in the input data 808. The number of belief states of the state tracker 802 may vary; there may be many belief states—one for each word in the vocabulary used by the model 800—or a few belief states selected specifically for a particular application. If there are many belief states, hand-crafted rules may be used during training to extract the belief state information.

Other training techniques may be used with the model 800 or other dialog systems described in the present disclosure. The model 800 may be penalized when, for example, it selects an erroneous parameter for an API call (as shown in FIG. 2). In a typical dialog session in a training corpus, a user and dialog system go through a number of turns of dialog before the dialog system learns the necessary information to make the request to the third-party device via the API. In some embodiments, however, the model 800 is trained at each step of dialog with the final API call information, even if that information was unknown at that step of dialog. In other embodiments, if the user changes an earlier choice at a step in the dialog, the model is first trained with the API call information until the change occurs, then trained with the final API call information.

The model(s) discussed herein may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the post-result ranker component 265, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
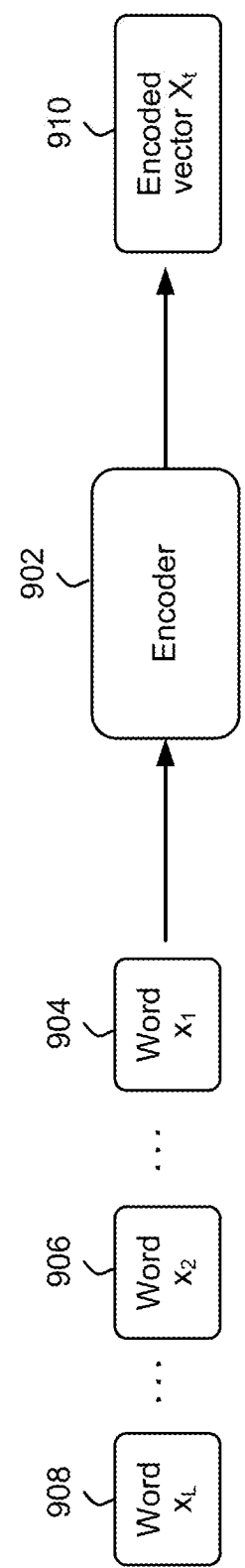
FIG. 9 illustrates operation of an encoder according to embodiments of the present disclosure.

FIG. 9 illustrates an encoder 902. An input word sequence, starting with words $x_1$ 904 and $x_2$ 906 and continuing through words $x_L$ 908, is input into the encoder 902; L is the length of the input word sequence in a given dialog turn. Given the input sequence 904, 906, 908, the encoder 892 projects this sequence to $X_t$ 910, with $X_t$ being an F-dimensional vector. F may be a fixed length of the vector and may be configurable depending on the configuration of a particular dialog system. The value of F may be, for example, between 1 and 100, but any value may be used. The encoder 902 may be configured to output vectors $X_t$ having the same size regardless of the size L of the input word sequence in a given turn, thus ensuring a continuity of output vector size. The output vector $X_t$ may also be referred to as an embedding of the sequence $x_1, x_2, \ldots x_L$. The encoder 902 may be implemented as a recurrent neural network (RNN) using, for example, LSTM cells, and may further use dense layers, embedding layers, or any other such layers.

Figure 10:
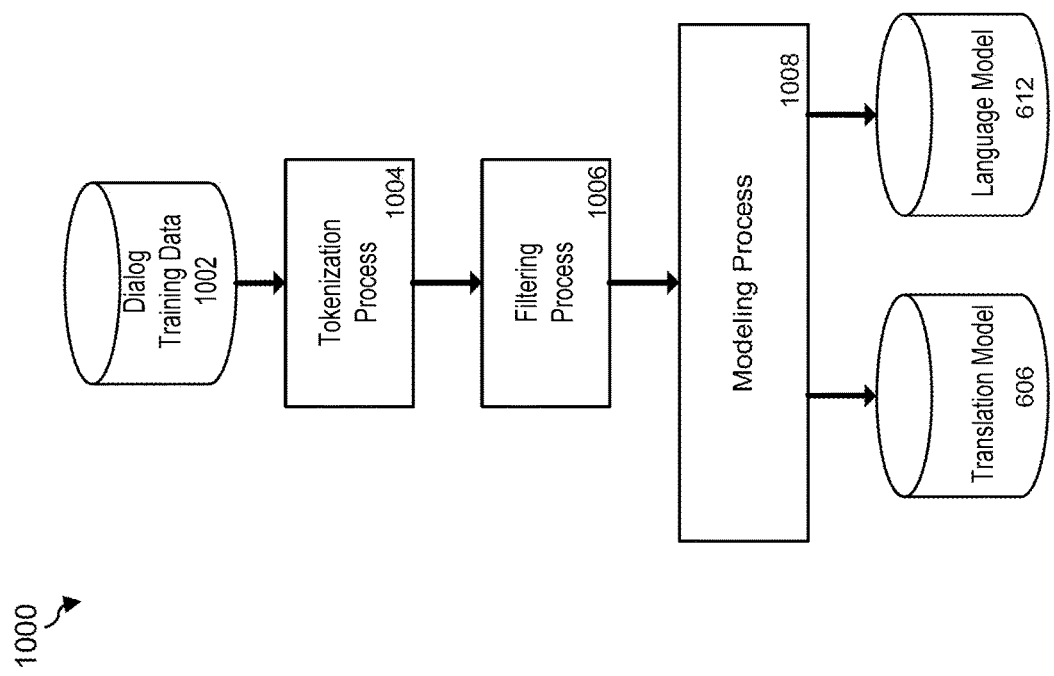
FIG. 10 illustrates a process for training of a model according to embodiments of the present disclosure.

FIG. 10 illustrates a training process 1000 that may be executed during a training period to create, for example, the translation model 606 and language model 612 shown in FIG. 6. In general, dialog training data 1002 includes a large number of goal-oriented dialog exchanges, some or all of which include a determination of the goal of the user and a corresponding API call. The user side of the dialog exchanges in the dialog training data 1002 is applied as input to the translation and/or language models 606, 612. The output of the models 606, 612 is then tested to see how close it matches the dialog-system side of the dialog exchanges and/or API calls of the dialog training data 1002. If there is a mismatch, parameters associated with the models 606, 612—such as those associated with equations (1)-(5) of FIG. 4 or equations (6)-(12) associated with FIG. 5—are altered accordingly and the input is re-applied. Some or all of the training process 1000 may thus iterate until the dialog output and/or API calls generated by the models 606, 612 matches, within some acceptable variation, the dialog output of the dialog training data 1002.

As illustrated, a tokenization process 1004 may be first used to tokenize the text of the dialog training data 1002 by breaking the text into discrete units. For example, and without limitation, the tokenization process 1004 may separate punctuation characters, perform normalization on the text, and break apart contractions. The tokenized training data is then provided to a filtering process 1006.

The filtering process 1006 may be used to remove text from the tokenized training data that is not suitable for inclusion in the translation model 606 or for use in training the language model 612. For example, and without limitation, the filtering process 1006 may remove very long sentences that are not useful for creating the language model 612. Similarly, the filtering process 1006 may remove mismatched dialog turns that are not appropriate for use in the translation model 606; other types of filtering may be performed. The tokenized and filtered training data is then provided to a modeling process 1008 and, in some embodiments, a word alignment process.

The modeling process 1008 may use the tokenized and filtered training data iteratively, as described above, to create the translation model 606 and/or the language model 612. The word alignment process may be used to utilize unsupervised machine learning to learn a word alignment model describing word-level correspondences in the training data between dialog input and dialog output. The word alignment model may be saved for use during retraining processes, if any. The word-aligned training data may be provided to the modeling process 1008 for use in creating the translation model 606 and/or the language model 612.

The present disclosure is not limited to the steps of the training process 1000, however, and one of skill in the art will understand that the models described herein may be trained using other processes. The translation model 606 and the language model 612 may be trained at the same time or independently. In some embodiments, the word alignment process is not performed and the word alignment model is not generated. Once training is completed, the trained model(s) 606, 612 may be configured into a dialog engine 1110 in order to be operated at runtime to process user input data.

Figure 11:
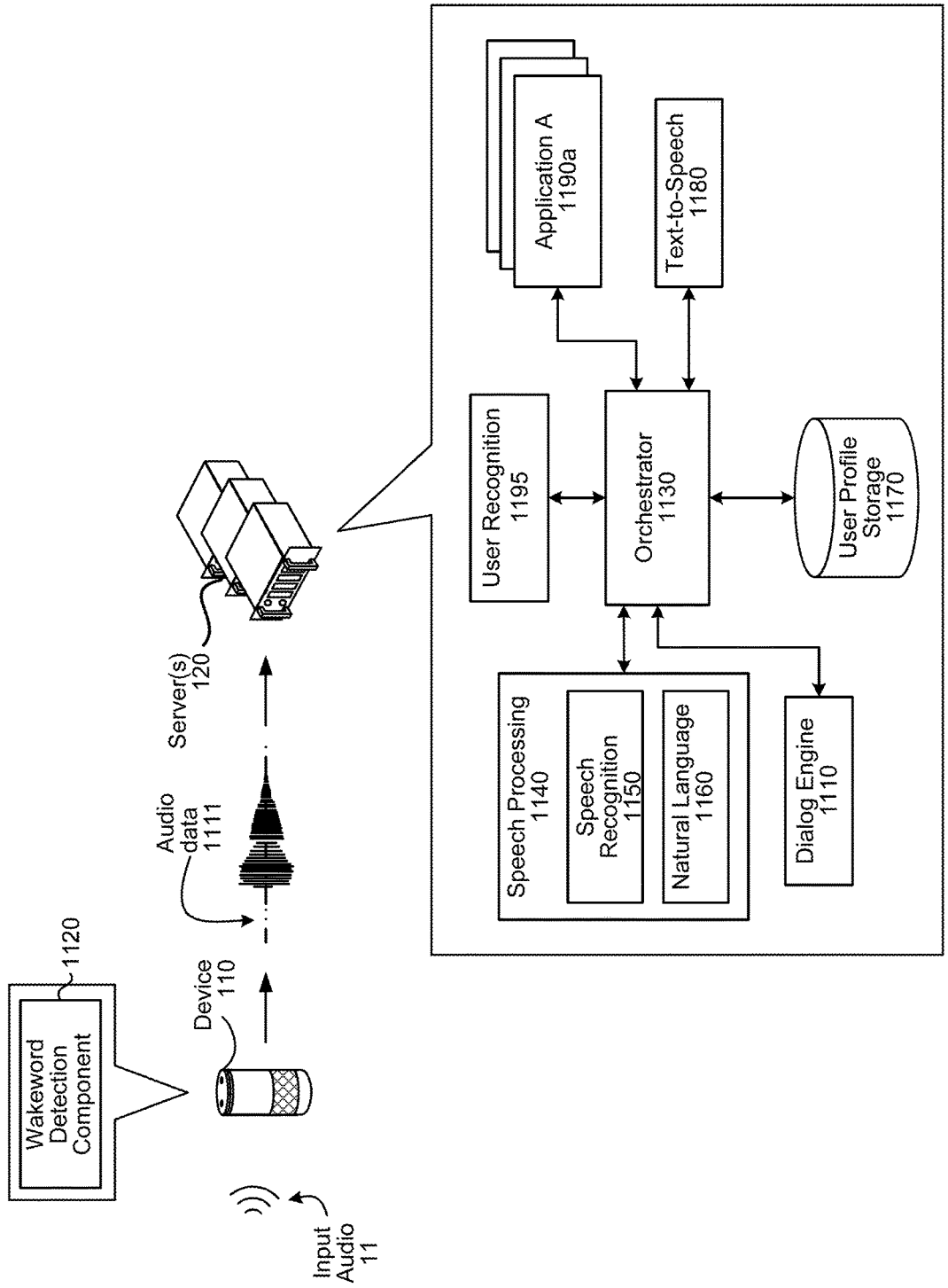
FIG. 11 is a conceptual diagram of components of a system according to embodiments of the present disclosure.

The system may operate using various components as described in FIG. 11. The various components illustrated FIG. 11 may be located on a same or different physical devices. Communication between various components illustrated in FIG. 11 may occur directly or across a network(s) 199.

The device 110 captures input audio 11, corresponding to a spoken utterance, using an audio capture component, such as a microphone or array of microphones. The device 110, using a wakeword detection component 1120, processes audio data corresponding to the input audio 11 to determine if a keyword (e.g., a wakeword) is detected in the audio data. Following detection of a wakeword, the device 110 sends audio data 1111, corresponding to the utterance, to the server(s) 120.

Upon receipt by the server(s) 120, the audio data 1111 may be sent to an orchestrator component 1130. The orchestrator component 1130 may include memory and logic that enables the orchestrator component 1130 to transmit various pieces and forms of data to various components of the system.

The orchestrator component 1130 sends the audio data 1111 to a speech processing component 1140. An automatic speech recognition (ASR) component 1150 of the speech processing component 1140 transcribes the audio data 1111 into one more textual interpretations representing speech contained in the audio data 1111. The speech recognition component 1150 interprets the spoken utterance based on a similarity between the spoken utterance and pre-established language models. For example, the speech recognition component 1150 may compare the audio data 1111 with models for sounds (e.g., subword units or phonemes) and sequences of sounds to identify words that match the sequence of sounds spoken in the utterance represented in the audio data 1111.

The speech recognition component 1150 may send text data generated thereby to a dialog engine 1110 which may operate a translation model and language model to drive and understand a dialog as described herein. As noted above, if input data originating from a user does comes in text form rather than audio form, the speech recognition component 1150 may not be used and the input text data may simply be sent, for example by the orchestrator 1130, to the dialog engine 1110. The dialog engine 1110 may operate various model components described above to translate user input text data into output text data.

The server(s) 120 may include a user recognition component 1195. The user recognition component 1195 may take as input the audio data 1111 and/or the text data output by the speech recognition component 1150. The user recognition component 1195 determines scores indicating whether the command originated from particular users. For example, a first score may indicate a likelihood that the command originated from a first user, a second score may indicate a likelihood that the command originated from a second user, etc. The user recognition component 1195 also determines an overall confidence regarding the accuracy of user recognition operations. The user recognition component 1195 may perform user recognition by comparing speech characteristics in the audio data 1111 to stored speech characteristics of users. The user recognition component 1195 may also perform user recognition by comparing biometric data (e.g., fingerprint data, iris data, etc.) received by the system in correlation with the present command to stored biometric data of users. The user recognition component 1195 may further perform user recognition by comparing image data (e.g., including a representation of at least a feature of a user) received by the system in correlation with the present command with stored image data (e.g., including representations of features of users). The user recognition component 1195 may perform additional user recognition processes, including those known in the art.

The server(s) 120 may include a user profile storage 1170. The user profile storage 1170 may include a variety of information related to individual users, groups of users, etc. that interact with the system. The user profile storage 1170 may include one or more customer profiles. Each customer profile may be associated with a different customer identifier (ID). A customer profile may be an umbrella profile specific to a group of users. That is, a customer profile encompasses two or more individual user profiles, each associated with a unique respective user ID. For example, a customer profile may be a household profile that encompasses user profiles associated with multiple users of a single household. A customer profile may include preferences shared by all of the user profiles encompassed thereby. Each user profile encompassed under a single customer profile may include preferences specific to the user associated therewith. That is, each user profile may include preferences unique with respect to one or more other user profiles encompassed by the same customer profile. A user profile may be a stand-alone profile or may be encompassed under a customer profile. As illustrated, the user profile storage 1170 is implemented as part of the server(s) 120. However, it should be appreciated that the user profile storage 1170 may be located proximate to the server(s) 120, or may otherwise be in communication with the server(s) 120, for example over the network(s) 199.

The orchestrator component 1130 may coordinate the exchange of data within/among the server(s) 120. For example, the orchestrator component 1130 may send output from the speech processing component 1140 and optionally output from the user recognition component 1195 and/or data from the user profile storage 1170, to the dialog engine 1110 and/or one or more applications 1190. FIG. 11 illustrates various applications 1190 executed by the server(s) 120. However, it should be appreciated that the orchestrator component 1130 may additionally or alternatively send output to one or more remote devices executing applications that may thereby cause the remote devices to provide the server(s) 120 with content responsive to the command. The orchestrator component 1130 may also send data to an API 140 to be sent to one or more application server(s) 125.

An "application," as used herein, may be considered synonymous with a skill. A "skill" may be software running on the server(s) 120 that is akin to an application. That is, a skill may enable the server(s) 120 or other remote device to execute specific functionality in order to provide data or produce some other output requested by a user. The system may be configured with more than one skill. A skill may either be executed by the server(s) 120 or merely associated with the server(s) 120 (i.e., one executed by a different remote device). For example, a weather service skill may enable the server(s) 120 to execute a command with respect to a weather service server(s), a car service skill may enable the server(s) 120 to execute a command with respect to a taxi or ride sharing service server(s), an order pizza skill may enable the server(s) 120 to execute a command with respect to a restaurant server(s), etc.

The orchestrator component 1130 may choose which application 1190 to send data to based on the output of the dialog engine 1110. In an example, the orchestrator component 1130 may send data to a music playing application when the dialog engine 1110 outputs text data associated with a command to play music. In another example, the orchestrator component 1130 may send data to a restaurant application when the dialog engine 1110 outputs text data associated with a command to make a restaurant reservation. In yet another example, the orchestrator component 1130 may send data to a search engine application when the dialog engine 1110 outputs text data associated with a command to obtain search results.

An application 1190 may output text data, which the orchestrator component 1130 may send to a text-to-speech component 1180. The text-to-speech component 1180 may synthesize speech corresponding to the text data input therein. The server(s) 120 may send audio data synthesized by the text-to-speech component 1180 to the device 110 (or another device including a speaker and associated with the same user ID or customer ID) for output to the user.

The text-to-speech component 1180 may perform speech synthesis using one or more different methods. In one method of synthesis called unit selection, the text-to-speech component 1180 matches text data against a database of recorded speech. Matching units are selected and concatenated together to form audio data. In another method of synthesis called parametric synthesis, the text-to-speech component 1180 varies parameters such as frequency, volume, and noise to create an artificial speech waveform output. Parametric synthesis uses a computerized voice generator, sometimes called a vocoder.

The user profile storage 1170 may include data regarding customer profiles such as individual user profiles, family profiles, etc. Each user profile may include information indicating the devices associated with the profile, the locations of the devices, enabled applications 1190, language preferences, whether a device detects the presence of a user, or other such information.

Figure 12:
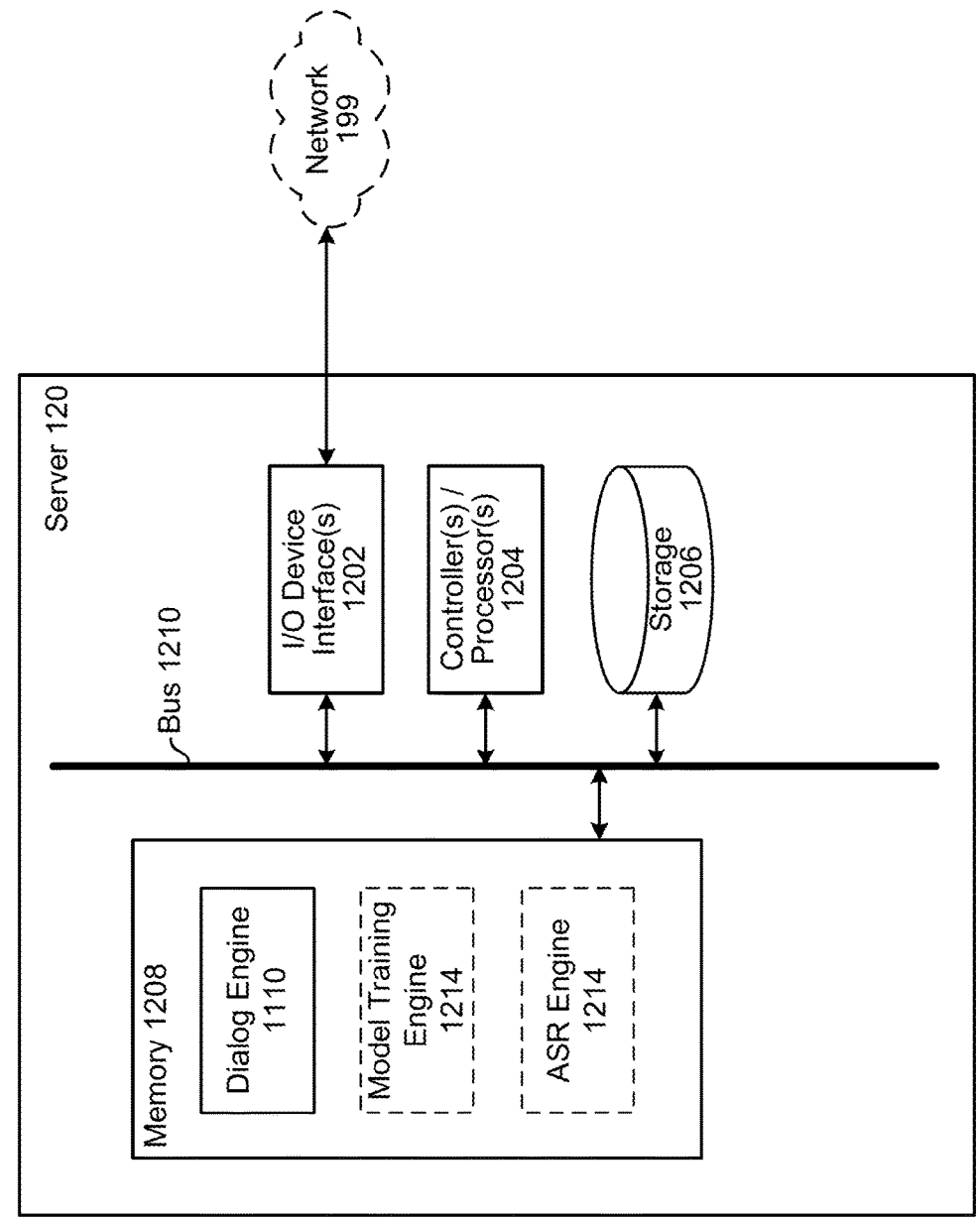
FIG. 12 is a block diagram conceptually illustrating example components of a server according to embodiments of the present disclosure.

FIG. 12 is a block diagram conceptually illustrating a computing environment 1200 that includes the server 120 of FIG. 1. The server 120 may include one or more input/output device interfaces 1202 and controllers/processors 1204. The server 120 may further include storage 1206 and a memory 1208. A bus 1210 may allow the input/output device interfaces 1202, controllers/processors 1204, storage 1206, and memory 1208 to communicate with each other; the components may instead or in addition be directly connected to each other or be connected via a different bus.

A variety of components may be connected through the input/output device interfaces 1202. For example, the input/output device interfaces 1202 may be used to connect to the network 199. Further components include keyboards, mice, displays, touchscreens, microphones, speakers, and any other type of user input/output device. The components may further include USB drives, removable hard drives, or any other type of removable storage.

The controllers/processors 1204 may processes data and computer-readable instructions, and may include a general-purpose central-processing unit, a specific-purpose processor such as a graphics processor, a digital-signal processor, an application-specific integrated circuit, a microcontroller, or any other type of controller or processor. The memory 1208 may include volatile random access memory (RAM), non-volatile read only memory (ROM), non-volatile magnetoresistive (MRAM), and/or other types of memory. The storage 1206 may be used for storing data and controller/processor-executable instructions on one or more non-volatile storage types, such as magnetic storage, optical storage, solid-state storage, etc.

Computer instructions for operating the server 120 and its various components may be executed by the controller(s)/processor(s) 1204 using the memory 1208 as temporary "working" storage at runtime. The computer instructions may be stored in a non-transitory manner in the memory 1208, storage 1206, and/or an external device(s). Alternatively, some or all of the executable instructions may be embedded in hardware or firmware on the respective device in addition to or instead of software.

The memory 1208 may include instructions for a dialog engine 1110 in accordance with the dialog systems disclosed herein, such as the system 600 of FIG. 6, to thereby carry out the steps 180 disclosed with reference to FIG. 1. The dialog engine 1110 may include instructions to, for example, receive (122) input data corresponding to a user query and encode (124) the input data into a first vector using a first trained model (e.g., a first translation model). The dialog engine 1110 then processes the encoded vector using a second trained model (e.g., a second translation model) to determine (126) a first plurality of probability distributions corresponding to candidate probabilities of items in a vocabulary, where each probability corresponds to a likelihood that a particular word in the system's vocabulary corresponds to response data and/or instruction data. Then the dialog engine 1110 processes the encoded vector and probabilities using a language model to determine (128) instruction data corresponding to the user query and to determine (128) output data corresponding to the response to the user query and/or instruction data. The dialog engine 1110 then sends (130) at least a portion of the output data to the user device corresponding to the user query. The memory may further include instructions for a model training engine 1214 in accordance with, for example, the training process 1000 illustrates in FIG. 10 and/or an ASR engine 1216 in accordance with, for example, the speech processing component 1140.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for responding to a request input to a client device, comprising:
    determining first text data corresponding to at least a first aspect of the request;
    processing at least the first text data using a first stage of a translation model neural network of a goal-oriented dialog system to determine a first context vector;
    processing at least the first context vector using a second stage of the translation model neural network to determine a first plurality of candidate probabilities of words in a vocabulary, the first plurality of candidate probabilities comprising:
        a first probability for a first word in the vocabulary, the first probability indicating a likelihood the first word represents the first aspect of the request, and
        a second probability for a second word in the vocabulary, the second probability indicating a likelihood that the second word represents the first aspect of the request;
    processing at least the first context vector and the first plurality of candidate probabilities using a language model neural network of the goal-oriented dialog system to determine first output text data corresponding to a response to the first text data;
    sending a representation of at least a portion of the first output text data to the client device; and
    sending, to an application server, a first instruction to respond to the request.

2. The computer-implemented method of claim 1, further comprising:
    after sending the representation of the portion of the first output text data to the client device, determining second text data corresponding to a second aspect of the request;
    processing at least the second text data using the first stage of the translation model neural network to determine a second context vector;
    processing the second context vector using the second stage of the translation model neural network to determine a second plurality of candidate probabilities of words in the vocabulary, the second plurality of candidate probabilities comprising:
        a third probability for a third word in the vocabulary, the third probability indicating a likelihood the third word represents the second aspect of the request, and
        a fourth probability for a fourth word in the vocabulary, the fourth probability indicating a likelihood the fourth word represents the second aspect of the request;
    processing at least the second context vector and the second plurality of candidate probabilities using the language model neural network to determine second output text data corresponding to a response to the second text data; and
    sending a representation of at least a portion of the second output text data to the client device.

3. The computer-implemented method of claim 2, further comprising:
    after sending the representation of the portion of the second output text data to the client device, determining third input text data corresponding to a modified second aspect of the request different from the second aspect of the request;
    processing at least the third input text data using the first stage of the translation model neural network to determine a third context vector;
    processing the second context vector using the second stage of the translation model neural network to determine a third plurality of candidate probabilities of words in the vocabulary, the third plurality of candidate probabilities comprising:
        a fifth probability for a fifth word in the vocabulary, the fifth probability indicating a likelihood the fifth word represents the modified second aspect of the request;
    processing at least the third context vector and the third plurality of candidate probabilities using the language model neural network to determine third output text data corresponding to a response to the third input text data; and sending a representation of at least a portion of the third output text data to the client device.

4. A computer-implemented method for responding to a user query input to a user device, comprising:
   determining first text data corresponding to the user query, the first text data corresponding to items in a vocabulary;
   processing at least the first text data using a first stage of a translation model of a goal-oriented dialog system to determine a first vector;
   processing at least the first vector using a second stage of the translation model to determine a first plurality of candidate probabilities, wherein individual ones of the first plurality of candidate probabilities correspond to a respective likelihood of a particular item of the vocabulary being included in first output data corresponding to the user query;
   processing at least the first vector and the first plurality of candidate probabilities using a language model of the goal-oriented dialog system to determine the first output data;
   identifying at least a portion of the first output data as response data corresponding to the user query; and
   causing the response data to be sent to the user device so as to cause the user device to output a response to the user query.

5. The computer-implemented method of claim 4, further comprising:
   including at least a portion of the first output data in instruction data corresponding to a request represented at least in part in the user query; and
   sending the instruction data to an application component for execution of the request.

6. The computer-implemented method of claim 5, further comprising:
   selecting, using the language model, the application component from a plurality of devices based at least in part on the first vector and the first plurality of candidate probabilities.

7. The computer-implemented method of claim 4, wherein the first stage of the translation model comprises a first translation model neural network trained to encode the first text data into the first vector and wherein the second stage of the translation model comprises a second translation model neural network trained to determine the first plurality of candidate probabilities.

8. The computer-implemented method of claim 7, wherein the first translation model neural network comprises an embedding layer, a long-short-term memory layer, and a dense layer, and wherein the second translation model neural network comprises a long-short-term memory layer and a dense layer.

9. The computer-implemented method of claim 4, wherein processing at least the first vector using the second stage of the translation model determines a likelihood that a word in the vocabulary is used in the first output data given the first text data.

10. The computer-implemented method of claim 5, further comprising:
    determining second text data corresponding to a change to the request;
    processing at least the second text data using the first stage of the translation model to determine a second vector;
    processing at least the second vector using the second stage of the translation model to determine a second plurality of candidate probabilities; and
    processing at least the second vector and the second plurality of candidate probabilities using the language model to determine second output data corresponding to the change to the request; and
    including at least a portion of the second output data in the instruction data.

11. The computer-implemented method of claim 4, further comprising:
    determining that the first text data comprises an input word corresponding to a preprogrammed aspect of instruction data;
    storing the input word in a state tracker; and
    sending the input word to an application component for execution of a request represented at least in part in the user query.

12. A goal-oriented dialog system, comprising:
    at least one processor; and
    at least one computer-readable medium encoded with instructions that, when executed by the at least one processor, cause the goal-oriented dialog system to:
       determine first text data corresponding to a user query input to a user device, the first text data corresponding to items in a vocabulary;
       process at least the first text data using a first stage of a translation model of the goal-oriented dialog system to determine a first vector;
       process at least the first vector using a second stage of the translation model to determine a first plurality of candidate probabilities, wherein individual ones of the first plurality of candidate probabilities correspond to a respective likelihood of a particular item of the vocabulary being included in first output data corresponding to the user query;
       process at least the first vector and the first plurality of candidate probabilities using a language model of the goal-oriented dialog system to determine the first output data;
       identify at least a portion of the first output data as response data corresponding to the user query; and
       cause the response data to be sent to the user device so as to cause the user device to output a response to the user query.

13. The goal-oriented dialog system of claim 12, wherein the at least one computer-readable medium is encoded with additional instructions that, when executed by the at least one processor, further cause the goal-oriented dialog system to:
    include at least a portion of the first output data in instruction data corresponding to a request represented at least in part in the user query; and
    send the instruction data to an application component for execution of the request.

14. The goal-oriented dialog system of claim 13, wherein the at least one computer-readable medium is encoded with additional instructions that, when executed by the at least one processor, further cause the goal-oriented dialog system to:
    select, using the language model, the application component from a plurality of devices based at least in part on the first vector and the first plurality of candidate probabilities.

15. The goal-oriented dialog system of claim 12, wherein the first stage of the translation model comprises a first machine learning model trained to encode the first text data into the first vector and wherein the second stage of the translation model comprises a second machine learning model trained to determine the first plurality of candidate probabilities.

16. The goal-oriented dialog system of claim 15, wherein the first machine learning model comprises an embedding layer, a long-short-term memory layer, and a dense layer, and wherein the second machine learning model comprises a long-short-term memory layer and a dense layer.

17. The goal-oriented dialog system of claim 12, wherein the second stage of the translation model is configured to determine a likelihood that a word in the vocabulary is used in the first output data given the first text data.

18. The goal-oriented dialog system of claim 13, wherein the at least one computer-readable medium is encoded with additional instructions that, when executed by the at least one processor, further cause the goal-oriented dialog system to:
    determine second text data corresponding to a change to the request;
    process at least the second text data using the first stage of the translation model to determine a second vector;
    process at least the second vector using the second stage of the translation model to determine a second plurality of candidate probabilities;
    process at least the second vector and the second plurality of candidate probabilities using the language model to determine second output data corresponding to the change to the request; and
    include at least a portion of the second output data in the instruction data.

19. The goal-oriented dialog system of claim 12, wherein the at least one computer-readable medium is encoded with additional instructions that, when executed by the at least one processor, further cause the goal-oriented dialog system to:
    determine that the first text data comprises an input word corresponding to a preprogrammed aspect of instruction data;
    store the input word in a state tracker; and
    send the input word to an application component for execution of a request represented at least in part in the user query.

* * * * *